UNITED STATES PATENT OFFICE.

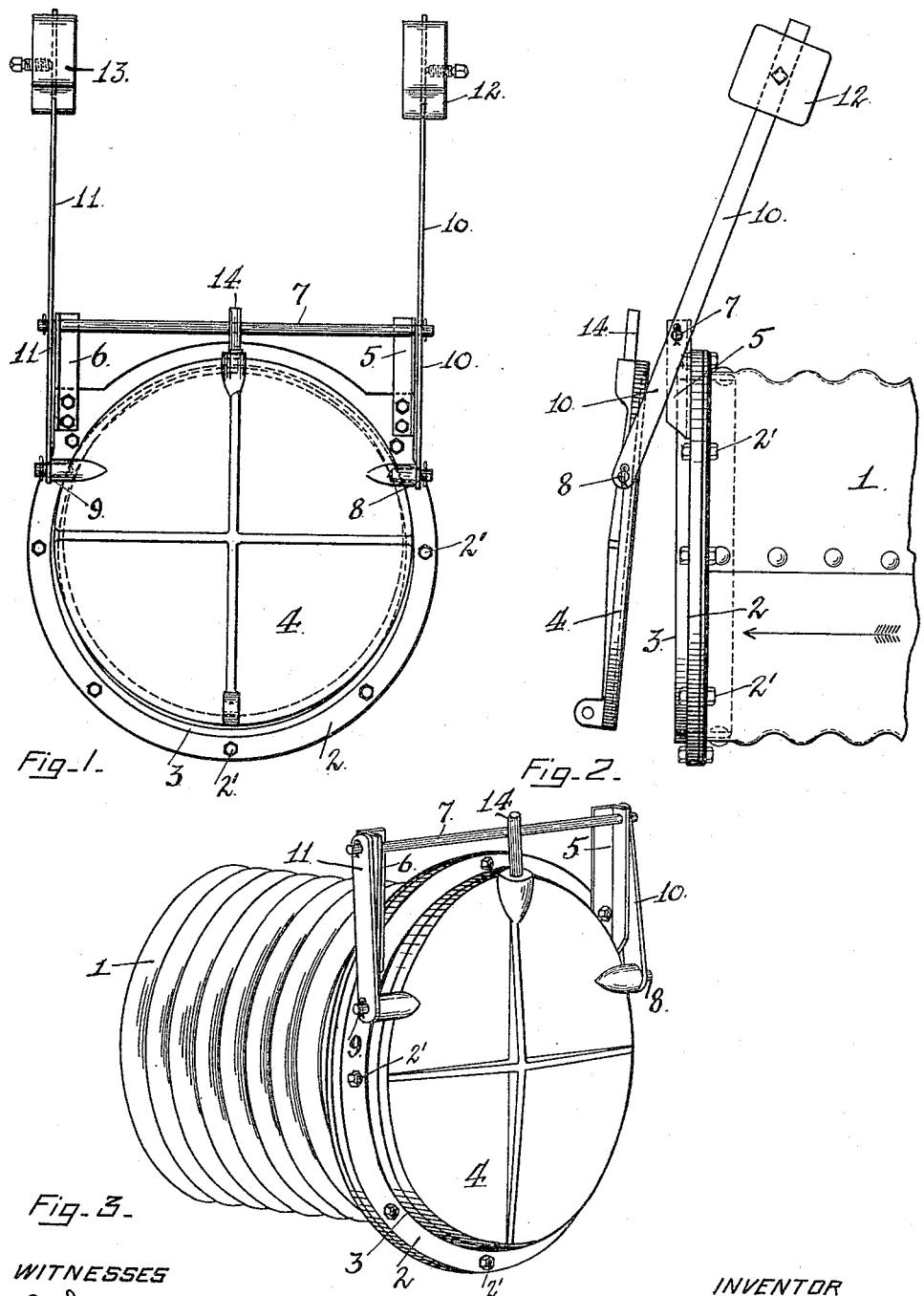

KARL JOHAN THORSBY, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

FLOOD-GATE.

1,168,579. Specification of Letters Patent. Patented Jan. 18, 1916.

Application filed August 17, 1914. Serial No. 857,104.

*To all whom it may concern:*

Be it known that I, KARL JOHAN THORSBY, a subject of the King of Norway, residing at Oakland, in the county of Alameda and State of California, have invented certain new and useful Improvements in Flood-Gates, of which the following is a specification.

My invention relates to automatically operated flood-gates, and has for its object the provision of a simple, durable and dependable gate of this class.

My invention consists essentially in the novel mounting of the gate, resulting in sensitive movement, extensive opening capacity with minimum travel from its seat, easy return and effective closing, as I shall hereinafter fully describe by reference to the accompanying drawings, in which—

Figure 1 is a front view of my flood-gate. Fig. 2 is a side view of the same, the gate being shown open. Fig. 3 is a perspective view showing the gate closed, and showing also the omission of the counterbalancing weights, as suitable for smaller gates.

1 is a conduit, here shown merely for illustration, as a pipe constructed of corrugated sheet metal, though it is to be understood that the conduit may be of any character. Suitably secured to the end of the conduit, as, for example, by the bolts 2' is the gate-member 2, the faced surface 3 of which acts as a seat for the gate 4. Rising from the gate-member 2 are the extensions 5 and 6, one on each side.

7 is a rod carried by and between said extensions. The gate 4 is formed or provided with the lugs or pins 8 and 9, one on each side, and these are pivoted in the lower ends of the links 10 and 11, respectively, which links are pivoted above on the rod 7. The position of the lugs or pins 8 and 9 is to be noted as follows. They are so located as to insure a substantially vertical position of the gate when open. This results from placing them one on each side of the gate on a horizontal line above the center of gravity of the gate.

For small gates the links 10 and 11 may stop with the rod 7, as shown in Fig. 3, but for heavier gates it is best to carry the links above the rod 7 and provide them with adjustable counterbalance weights 12 and 13, as shown in Figs. 1 and 2. The top of the gate is provided with a stop-pin 14 adapted to contact with the rod 7.

The operation is as follows:—When the water runs, as indicated by the arrow in Fig. 2, the gate 4 is forced open, and this movement causes the links 10 and 11 to swing out, thereby giving the gate a free swing on the pivot pins 8 and 9. The gate is balanced in such a manner as to always tend to keep in a vertical position, and this yields the desirable result of giving an extensive opening, that is, all around the mouth of the conduit, at the same time that the gate itself has traveled a minimum distance from its seat. The gate is, therefore, sensitive under the pressure of low or shallow water. This sensitiveness is increased by the counterweights, and a very slight head is sufficient to open the gate and allow the water to flow.

The operation may be more particularly expressed as follows:—If the gate 4 be permitted to hang freely it will tend to bring the lugs or pins 8 and 9 nearly in a vertical line with the rod 7, thereby seating said gate on the face 3 of the gate-member 2. When the gate is thus seated, it is almost in a state of equilibrium, that is to say, if the gate-member 2 were not present, the gate would swing very little farther until exactly in a vertical line with the rod 7. Therefore, very little pressure is exerted between the gate 4 and its seat, which pressure though sufficient to properly seat it, yet gives the highest degree of sensitiveness with simplicity of construction. Thus a very slight head of water is required to open the gate. But when a large amount of water is passing, the gate, then assuming the position shown in Fig. 2, gives a maximum opening with the least travel of the pins or lugs 8 and 9, thereby effecting a minimum amount of counteraction to the flow.

The effect of the pin 14 acting against the rod 7 is to prevent the gate from getting into a wedging position in the top of the mouth of the conduit, under its tendency to swing back and forth when the conduit is flowing full with a great velocity. The pin does not, however, in any way, interfere with the intended purpose and action of the gate.

I claim:—

1. A flood-gate comprising a conduit; a gate-seating member carried by the conduit; a gate; and gate-supporting links symmetrically disposed with relation to the vertical center line of said gate, one on each side thereof, pivotally connected at their lower ends to said gate in a horizontal line above its center of gravity, and at their upper ends pivotally connected, in a horizontal line, with the gate-seating member in such position with relation thereto that said gate when closed is substantially in a state of equilibrium with respect to said pivotal connections.

2. A flood-gate comprising a conduit; a gate-seating member carried by the conduit; a gate; and gate supporting links symmetrically disposed with relation to the vertical center line of said gate, one on each side thereof, pivotally connected at their lower ends to said gate in a horizontal line above its center of gravity, and at their upper ends pivotally connected, in a horizontal line, with the gate-seating member in such position with relation thereto that said gate when closed is substantially in a state of equilibrium with respect to said pivotal connections, said links being extended beyond their pivotal connections with said gate seating member, and provided with counterweights.

3. A flood-gate comprising a conduit; a gate-seating member carried by the conduit; extensions rising from said member; a rod carried between said extensions; a gate; gate-supporting links pivotally connected with said gate and pivoted on said rod; and a stop pin on the gate-top coacting with said rod.

4. A flood-gate comprising a conduit; a gate-seating member carried by the conduit; extensions rising from said member; a rod carried between said extensions; a gate; gate-supporting links pivotally connected with said gate and pivoted on said rod, said links being extended above said rod and provided with counterweights; and a stop pin on the gate-top coacting with said rod.

In testimony whereof I have signed my name to this specification in the presence of two subscribing witnesses.

KARL JOHAN THORSBY.

Witnesses:
C. R. HODGKIN,
S. A. FORD.

Copies of this patent may be obtained for five cents each, by addressing the "Commissioner of Patents, Washington, D. C."